United States Patent [19]

Rizkalla

[11] 4,139,594

[45] Feb. 13, 1979

[54] PROCESS FOR EXTRACTING TRIVALENT THALLIUM VALUES FROM AQUEOUS SOLUTIONS

[75] Inventor: Nabil M. Rizkalla, River Vale, N.J.

[73] Assignee: Halcon Research & Development Corp., New York, N.Y.

[21] Appl. No.: 896,549

[22] Filed: Apr. 14, 1978

[51] Int. Cl.$^2$ .............................................. C01G 15/00
[52] U.S. Cl. ................................ 423/112; 75/101 BE; 423/DIG. 14
[58] Field of Search ............ 423/112, 658.5, DIG. 14; 75/101 BE

[56] References Cited

U.S. PATENT DOCUMENTS

| 3,399,956 | 9/1968 | Hirose et al. | 423/495 |
| 4,031,196 | 6/1977 | Leonard | 423/624 |

FOREIGN PATENT DOCUMENTS

| 45-17288 | 6/1970 | Japan | 423/112 |
| 45-17289 | 6/1970 | Japan | 423/112 |

OTHER PUBLICATIONS

Schweitzer et al., "Anal. Chim. Acat", vol. 45, 1969, pp. 192–195.
Kuzin et al., "Chemical Absts.", vol. 65, p. 6298h.
Morrison et al., "Solvent Extraction in Analytical Chemistry", John Wiley & Sons, N.Y., 1957, pp. 236–237.

Primary Examiner—Herbert T. Carter
Attorney, Agent, or Firm—W. C. Long; D. Dick; J. B. Murray, Jr.

[57] ABSTRACT

Trivalent thallium values are extractively recovered from aqueous media containing dissolved trivalent and monovalent thallium values by contacting the aqueous medium in the presence of an alkanoic acid, having from 2 to 4 carbon atoms per molecule and having a molecular weight of at least 74 grams per gram-mol of acid, with an inert, organic, non-acidic solvent for the alkanoic acid, said solvent having limited solubility in water, to preferentially extract at least a portion of the dissolved trivalent thallium values into the organic solvent extractant and recovering an extract comprising the organic solvent containing the extracted trivalent thallium values.

16 Claims, No Drawings

PROCESS FOR EXTRACTING TRIVALENT THALLIUM VALUES FROM AQUEOUS SOLUTIONS

BACKGROUND OF THE INVENTION

1. Field of the Invention

This invention relates generally to the recovery of trivalent thallium values from solutions, and more specifically to the extractive recovery of trivalent thallium values from aqueous media.

2. Description of the Prior Art

Trivalent thallium compounds, i.e., thallic compounds, have been used as oxidizing agents in various reactions. For example, Kruse et al. J. Org. Chem. 36, 1154 (1971) describes the epoxidation of certain olefins with thallic acetate and U.S. Pat. No. 3,641,067 (issued in 1972 to W. Kruse) relates to the preparation of the epoxides of propylene and isobutylene by means of lower thallic alkanoates.

In all of these reactions the trivalent thallium is reduced to the monovalent state and, if the thallium is to be reused in the reaction, it is necessary to reoxidize or "regenerate" it by converting thallium (I) to thallium (III). Various methods for effecting this conversion have been proposed. Thus, it is proposed to convert thallium (I) to thallium (III) in the application of William Brill, entitled "Catalytic Conversion of Thallium (I) to Thallium (III), " Ser. No. 789,053, filed Apr. 21, 1977, by means of molecular oxygen using a Group VIII noble metal as a catalyst. In addition, it has been proposed in the application of Richard A. Johnson entitled, "Conversion of Monovalent Thallium to Trivalent Thallium," Ser. No. 740,147, filed Nov. 8, 1976, to convert thallium (I) to thallium (III) by means of molecular oxygen in the presence of a Group VIII noble metal catalyst and in the presence of a promoter comprising an alkali metal compound. The processes of both Ser. No. 789,053 and Ser. No. 740,147 typically result in an aqueous medium containing the desired trivalent thallium compound together with unconverted monovalent thallium compound and alkali metal compound, where the latter is employed as promoter in accordance with Ser. No. 740,147. It is generally desirable to recover the trivalent thallium compound from the aqueous medium produced by the foregoing processes to avoid passing monovalent thallium compound and alkali metal compound (where employed) as impurities to the subsequent reaction steps using the trivalent thallium compound. However, separation of the trivalent thallium compound from the aqueous medium by precipitation entails additional process steps which, albeit effective, introduce complexity into the recovery of the trivalent material, and evaporation of water from the aqueous medium containing the trivalent thallium compound does not achieve any separation of the trivalent thallium compounds from other salts contained in the aqueous medium.

It has been proposed in Japanese Patent Publication No. 50/92,296, published July 23, 1975, to extract thallic salts from aqueous solutions containing HBr or HCl using polar organic solvents and mixing the resulting organic layer with nonpolar organic solvents and water whereby the thallic ions are reextracted into the aqueous phase as the halogen thallium acid (e.g., $HTlBr_4$ or $HTlCl_4$). However, such a process is not readily adaptable to treatment of aqueous media containing monovalent and trivalent thallium values since the monovalent thallium ions will be precipitated as the corresponding halide, which precipitate must be recovered and treated for conversion of the monovalent thallium content thereof to a water-soluble form before further processing can be effected, e.g., before recycle of the monovalent thallium values to an oxidation step in which trivalent thallium values are formed therefrom.

Recovery of trivalent thallium values in the form of $TlCl_4^-$ or $TlBr_4^-$ using an anion exchange resin as suggested in U.S. Pat. No. 3,399,956 (issued in 1968 to I. Hirose et al.) is disadvantageous due to the high cost of the resin required for recovery of large amounts of trivalent thallium in an industrial scale process.

Other extraction techniques have been developed as analytical tools in which trivalent thallium ions are recovered from aqueous solutions employing such extractants as diethyldithiocarbamate and 8-quinolinol-4-thenoyltrifluoroacetone, as outlined in G. H. Morrison and H. Freiser, *Solvent Extraction in Analytical Chemistry* 237 (John Wiley & Sons 1957). However, such analytical extraction methods are not readily adaptable to industrial processes and offer the disadvantage of the extreme high cost of such extractants on an industrial scale.

Other extraction methods employed for treatment of liquids containing monovalent thallium are not readily adaptable to separation of trivalent thallium from aqueous mixtures containing monovalent thallium. See U.S. Pat. No. 4,031,196 (issued in 1977 to J. J. Leonard) (extraction of isobutyric acid with dibutyl ether from aqueous medium also containing barium salt and thallous isobutyrate) and A. Letheridge et al., *J. Chem. Soc. Perkins I*, p. 2763 (1973) (extraction of aqueous mixture containing thallous trifluoroacetate and octene-1 oxidation products with ether). However, the aqueous media treated in these references, did not contain trivalent thallium.

SUMMARY OF THE INVENTION

It has been surprisingly found that trivalent thallium values can be preferentially extracted from an aqueous medium containing dissolved trivalent thallium values, monovalent thallium values and, optionally, alkali metal values by (i) contacting the aqueous medium in the presence of an alkanoic acid, having from 2 to 4 carbon atoms per molecule and having a molecular weight of at least 74 grams per gram-mol of acid, with an inert, organic, nonacidic solvent for the alkanoic acid, said solvent having limited solubility in water, to preferentially extract at least a portion of the dissolved trivalent thallium values into the organic solvent extractant and (ii) recovering an extract comprising the extracted trivalent thallium values and organic solvent.

By this process up to about 100% of the trivalent thallium values can be extracted from the aqueous solution in a rapid and economical manner.

The facile separation of thallic values from thallous values and alkali metal values is surprising in view of the double salts known to be formed between thallium (III) and thallium (I) compounds and between such thallium compounds and alkali metal cations. See, e.g., A. South, Jr. et al. *JACS*, vol. 90, no. 25, 7064 (1968) and R. J. Oulette et al., *J. Org. Chem.*, vol. 35, no. 10, 3210 (1970), as to thallium (III) - thallium (I) double salts and F. Challenger et al., *J. Chem. Soc.* 405 (1934); J. H. Pratt, *J. Amer. Chem. Soc.* vol. 49, p. 404, (1895); and G. Newmann, *Ann.*, vol. 244, p. 329 (1888), as to mixed thallium-alkali metal salts.

DETAILED DESCRIPTION OF THE INVENTION

As used herein, trivalent thallium values are termed to be "preferentially extracted" when the proportion of the trivalent thallium values originally present in the aqueous solution which are extracted into the organic extractant medium by the process of the present invention is greater than the proportion of the monovalent thallium values and alkali metal values originally present in the aqueous solution which are extracted into the organic extractant. Thus, while some monovalent thallium values and alkali metal values (where present) can also pass into the extractant, the equilibrium distribution coefficients for trivalent thallium cation in the process of the present invention have been surprisingly found to be far greater than the equilibrium distribution coefficients for monovalent thallium and alkali metal cations, the equilibrium distribution coefficients being defined by the expression (I):

$$k_a = C_a/C'_a \quad \text{(I)}$$

wherein $k_a$ is the equilibrium distribution coefficient for component "a," $C_a$ is the concentration of component "a" in the organic phase, and $C'_a$ is the concentration of component "a" in the aqueous phase, as determined at 25° C.

For example, the equilibrium distribution ("$k_{Tl_3}$") for trivalent thallium cation is given by the expression (II):

$$k_{Tl_3} = C_{Tl_3}/C'_{Tl_3} \quad \text{(II)}$$

and the equilibrium distribution coefficient ("$k_{Tl_1}$") is for monovalent thallium cation is given by the expression (III):

$$k_{Tl_1} = C_{Tl_1}/C'_{Tl_1} \quad \text{(III)}$$

The extraction of the trivalent thallium values can also be described by the following expressions, (IV) and (V):

$$\alpha_1 = k_{Tl_3}/k_{Tl_1} \quad \text{(IV)}$$

$$\alpha_2 = k_{Tl_3}/k_{A.M.} \quad \text{(V)}$$

wherein $k_{Tl_3}$ and $k_{Tl_1}$ are as defined above and $K_{A.M.}$ is the equilibrium distribution coefficient for alkali metal cation. Thus, trivalent thallium values are preferentially extracted in the process of the present invention when $\alpha_1$, the ratio of the equilibrium distribution coefficients for the trivalent and monovalent thallium cations, is greater than about 1. Where alkali metal cations are present, trivalent thallium values are preferentially extracted when $\alpha_2$ is also greater than about 1. Most preferably $\alpha_1$, is greater than about 2, and $\alpha_2$ is greater than about 2.

The aqueous medium containing trivalent and monovalent thallium values and, optionally, alkali metal values are, as described above, treated in accordance with this invention for recovery of trivalent thallium values by extraction in the presence of an alkanoic acid having from 2 to 4 carbon atoms per molecule and a molecular weight of at least 74 grams per gram-mol of the acid. Suitable alkanoic acids therefore include straight-chained and branched-chained acids, such as propanoic acid, n-butyric acid and iso-butyric acid. The alkanoic acid may be substituted or unsubstituted, and where substituted may contain such substituents as halide and nitrile.

Thus, suitable alkanoic acids include members selected from the group consisting of (1) compounds having the formula (VI):

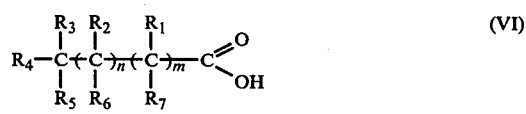

wherein n = 0 or 1, m = 0 or 1, and $R_1$, $R_2$, $R_3$, $R_4$, $R_5$, $R_6$, and $R_7$ are independently selected from the group consisting of H, Cl, Br, F, I and —CN, with the proviso that if n and m are each zero, then at least one of $R_3$, $R_4$ and $R_5$ must be Cl, Br, F, I or —CN, and (2) compounds having the formula (VII):

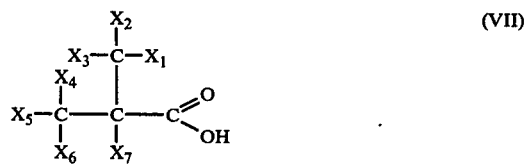

wherein $X_1$, $X_2$, $X_3$, $X_4$, $X_5$, $X_6$, and $X_7$ are independently selected from the group consisting of H, Cl, Br, F, I, and —CN.

Exemplary of such halide substituted alkanoic acids are the mono-, di- and tri-halo acetic acids (e.g., monochloroacetic acid, difluoroacetic acid, diiodoacetic acid, tribromoacetic acid, trichloroacetic acid and the like), halo-substituted propanoic acids (e.g., 3-bromopropanoic acid, 2-chloropropanoic acid, 2,2- and 2,3-dichloropropanoic acid, 3-iodopropanoic acid, 3-fluoropropanoic acid and the like) and halo-substituted isobutyric acids (e.g., 2-chloro-2-methyl propanoic acid, 2-methyl-3,3-difluoropropanoic acid and the like).

Preferred alkanoic acids in the practice of this invention are members selected from the group consisting of trifluoroacetic acid, trichloroacetic acid, propanoic acid, butyric acid and isobutyric acid. Of the foregoing, isobutyric acid is especially preferred.

The amount of the alkanoic acid which is employed can vary widely, but such acid will generally be employed in an amount of from about 1 to 200 weight percent, preferably from about 1 to 50 weight percent, of the aqueous medium to be extracted. Preferably, sufficient alkanoic acid is employed to produce in the aqueous medium a pH of not greater than about 6 and more preferably not greater than about 5.5, to avoid complicating the extractive recovery of trivalent thallium values therefrom as a result of the precipitation of substantial amounts of thallic oxide which occurs in alkaline media.

The selected alkanoic acid can be added to the aqueous medium to be extracted before treatment in accordance with the process of this invention, or can be premixed with the selected organic solvent for the acid or added to the vessel in which the extraction is to be performed.

A wide variety of anions and mixtures of anions can be associated with the monovalent and trivalent thallium values in the aqueous medium which is treated in accordance with this invention. The anion may be organic or inorganic. Examples of suitable inorganic anions include nitrate, sulfate, perchlorate, carbonate, bicarbonate and the like. Suitable organic anions include carboxylate anions such as those derived from alkyl, cycloalkyl or aryl carboxylic acids having up to 20 carbon atoms per acid molecule, and preferably from alkyl carboxylic acids containing up to 5, and most preferably from 1 to 4, carbon atoms per acid molecule, e.g., acetate, propionate, butyrate, isobutyrate, pentanoate and the like, and mixtures of such carboxylates. While not critical to the practice of the process of this invention, the aqueous medium to be extracted and the extractant medium, as indicated above, are preferably substantially free of free halide ions to avoid precipitation of monovalent thallium halides.

Preferably, trivalent thallium values are present in the aqueous medium as any of the following carboxylates, or mixtures thereof: acetate, propionate, butyrate and isobutyrate. The anion or mixture of anions associated with the monovalent thallium values can be the same as, or different from, the anion or anions associated with the trivalent thallium values contained in the aqueous medium. Also, the anion(s) associated with the trivalent and monovalent thallium in the extract can differ from the anion(s) of the trivalent and monovalent thallium in the aqueous medium which is treated. For example, when aqueous media containing thallic acetate and thallous acetate are extracted with isobutyric acid and isobutyronitrile in accordance with the process of this invention, the anion of the thallic and thallous values in the organic extract which is recovered will be found to be predominantly isobutyrate. Thus, the terms "trivalent thallium values" and "monovalent thallium values" for convenience are used herein to refer to the cations $Tl^{+3}$ and $Tl^{+1}$, respectively, which are dissolved in the liquid medium to which these terms are applied and are used without regard to the anions with which such cations are associated.

The alkali metal values which can be optionally present in the aqueous medium treated in accordance with the present invention can be derived from any of the alkali metal compounds employed as promoters as described in co-pending application Ser. No. 740,147, referred to above, which is hereby incorporated herein by reference. Thus, the alkali metal compound can comprise compounds of sodium, potassium, rubidium, cesium and lithium. Typical compounds are the oxides, salts (both organic and inorganic such as the carboxylates), the carbonates, bicarbonates and the like. The anion of the alkali metal compound most preferably corresponds to the anion associated with the trivalent thallium values to be extracted by the process of this invention. Of course, the precise form of the alkali metal values in the aqueous medium will vary depending on the degree to which such alkali metal compound is converted to another form by other ingredient of the aqueous medium. For example, when the aqueous medium contains free carboxylic acid (e.g., acetic acid), an alkali metal oxide (e.g., sodium oxide) which is added to the aqueous medium will be at least in part converted to the corresponding alkali metal carboxylate (e.g., sodium acetate). However, this is not critical to the practice of the present invention and, for convenience the term "alkali metal values" is used herein to refer to the alkali metal cations (e.g., $Na^{+1}$, $K^{+1}$, $Cs^{+1}$, $Rb^{+1}$ and the like) dissolved in the liquid medium to which this term is applied and is used without regard to the anion associated with such alkali metal cations.

The concentrations of monovalent thallium values, trivalent thallium values and alkali metal values in the aqueous medium treated by the process of the present invention is not in any way critical to the process of the present invention. Typically, the monovalent thallium and trivalent thallium values will each be present in concentrations of from about 0.1 to 5 mole per liter, and alkali metal values (where present) will also typically be present in a concentration of from about 0.1 to 5 mol per liter. However, aqueous media containing higher or lower concentrations of these dissolved values can be treated by this invention. Preferably, any solids, including solid mono- or trivalent thallium compounds, present in the aqueous solution are first removed by conventional techniques such as filtration, centrifuging or allowing the aqueous solution containing the solids to settle and decanting the solution, in order to obtain an aqueous medium substantially free of solids for treatment in accordance with the process of the present invention. However, removal of such solids is not critical to the practice of this invention.

Organic solvents for the selected alkanoic acid which are suitable for use in this invention are those solvents which are capable of extracting a majority of the selected alkanoic acid from an aqueous solution of the acid, as determined by extracting a sample of an aqueous solution containing ten weight percent of the alkanoic acid with the selected organic solvent, employing the organic solvent in a volume equal to the volume of water in the aqueous acidic sample, and measuring the relative concentrations of the alkanoic acid in the organic and aqueous phases at equilibrium at room temperature. The selected organic solvent, at equilibrium, should therefore contain (in such a test method for acid solubility) at least 50%, preferably at least about 70%, and most preferably at least about 90%, of the total moles of the alkanoic acid originally present in the aqueous solution tested.

The selected organic solvent should also be one which is "nonacidic," that is, it should be an organic solvent which does not contain a —COOH moiety in its molecular formula. Thus, higher carboxylic acids, such as those containing 5 or more carbon atoms per molecule, are not contemplated as organic solvents in accordance with the process of this invention.

Preferably, the organic solvent under conditions of extraction is also substantially inert to any component of the aqueous medium being extracted.

The organic solvent should also possess a limited solubility with water. The term "limited solubility in water" as used herein is intended to refer to organic solvents having a solubility in water at 20° C. of less than about 25 grams of solvent per 100 grams of water. More preferably, however, the organic solvent possesses a solubility in water at 20° C. of less than about 15, and most preferably less than about 5, grams of solvent per 100 grams of water. Water-immiscible organic solvents which are suitable include aromatic hydrocarbons, such as benzene, toluene, and the like; petroleum ether; alkyl ethers, such as diethyl ether, dimethyl ether, and the like; monocarboxylic acid esters having at least 5 carbon atoms per molecule, such as amyl acetate, methyl octanoate, and the like; organic alcohols having at least 4 carbon atoms per molecule, such as butanol, amyl alcohol, 3-methyl-1-butaol, 1-pentanol, octanol, and the like; chlorohydrocarbons, such as chloroform, carbon tetrachloride, methylene chloride, and the like; substituted aromatic hydrocarbons, such as chlorobenzene, nitrobenzene, anisole, acetophenone, and the like; ketones and diketones having at least 5 carbon atoms per molecule, such as octanone, acetylacetone, and the like; and nitriles having at least 3 carbon atoms per molecule, such as adiponitrile, propionitrile, butyronitrile, isobutyronitrile, benzonitrile, and the like.

Preferred as organic solvents in the practice of this invention are alkyl ethers, monocarboxylic acid esters having from 4 to 20 carbon atoms per molecule, organic alcohols having from 5 to 20 carbon atoms per molecule, and nitriles having from 3 to 20 carbon atoms per molecule. Especially preferred organic solvents are the aliphatic nitriles having from 3 to 12 carbon atoms per molecule and the aromatic nitriles having from 7 to 12 carbon atoms per molecule.

The amount of such organic solvent which is employed is not critical to the process of the present invention, but will generally be up to about 2000 weight percent, and preferably from about 500 to 1500 weight percent, of the amount of the alkanoic acid which is selected for use. Of course, amounts of organic solvent outside the foregoing ranges can also be used and is basically a question of economics.

Exemplary of preferred combinations of alkanoic acids and organic solvents in this invention are isobutyric acid in isobutyronitrile, benzonitrile, dibutyl ether or adiponitrile, and propionic acid in isobutyronitrile, benzonitrile, diethyl ether or adiponitrile.

The manner in which the aqueous medium containing the dissolved trivalent thallium values, monovalent thallium values and, optionally, alkali metal values is contacted with the selected alkanoic acid and organic acid is not critical to this invention and can be effected employing conventional liquid/liquid extraction techniques and apparatus. Single- or multi-stage extraction techniques can be employed. Thus, the aqueous medium to be treated can be treated with the extractant medium in a batchwise, semicontinuous or continuous manner as by simultaneously introducing the aqueous medium to be treated and the extractant medium into a stirred vessel wherein the mixture is agitated for intimate blending of the aqueous and organic phases. The resulting mixture can then be passed to a vessel wherein separate aqueous and organic layers are allowed to form. The organic layer comprises the organic solvent rich in trivalent thallium values and can be readily separated, and the recovered aqueous phase can be either recycled to the extraction step to remove additional trivalent thallium values therefrom, or, where desired, contacted with molecular oxygen or an organic hydroperoxide in the presence of a suitable catalyst in accordance with any of the processes of Ser. Nos. 740,147 or 789,053, referred to above, to convert monovalent thallium values contained therein to the trivalent state.

Alternatively, as is preferred, the aqueous medium to be treated can be contacted with the extractant medium by use of conventional countercurrent liquid/liquid extraction techniques. Conventional extraction apparatus can be employed.

The aqueous medium and extractant medium can be contacted under a wide variety of temperature and pressure conditions. Thus, the temperature employed can range from 5° C. to the bubble point of the aqueous medium treated or the extractant medium, whichever is lower boiling, and preferably from 20° to 60° C. Pressure is not a parameter of the process of this invention, and a pressure sufficient to maintain at least part of the aqueous medium to be treated and at least part of the extractant medium in the liquid form will be suitable. Generally, the pressure will be from about 0.5 to 10 atm., preferably from about 1 to 2 atm.

The extract which is produced can contain the extracted trivalent thallium values, together with monovalent thallium values and alkali metal values, in a wide variety of concentrations and typically will contain from about 0.01 to 3 moles per liter, preferably from about 0.5 to 2 moles per liter, trivalent thallium values; from about 0.01 to 3 moles per liter, preferably from about 0.01 to 0.5 moles per liter, monovalent thallium values; and (when present in the aqueous medium which is treated) from about 0.01 to 3 moles per liter, preferably from about 0.01 to 0.5 moles per liter, alkali metal values. However, higher or lower amounts of the foregoing components can be present. The organic solvent extract can also contain up to about 20 weight percent, preferably up to only about 5 weight percent, water.

The extract containing the extracted trivalent thallium values can be withdrawn as product, and, where the trivalent thallium values are, for example, in the form of a carboxylate, can be used (either directly or after evaporation of a portion of the acid extract to concentrate the liquid with respect to the trivalent thallium) as source of trivalent thallium carboxylate for epoxidizing olefins in accordance with U.S. Pat. No. 3,641,067. If it is desired to further concentrate the extract with respect to trivalent thallium values, by removing at least a portion of any monovalent thallium or alkali metal values which may be present, the extract can be treated by conventional methods for recovery of the trivalent thallium values therefrom. For example, the extract can be treated with a source of free halogen ion (e.g., chloride, bromide, or fluoride) to form the corresponding monovalent thallium halide removed, and the resulting treated extract contacted with an appropriate ion exchange resin to remove the alkali metal compound, thereby forming a liquid further concentrated in the trivalent thallium values. Alternatively, extracts containing trivalent thallium, monovalent thallium and optionally, alkali metal values, which are produced by the process of the present invention, can be treated for removal of monovalent thallium and alkali metal values therefrom by contacting the extract with water in a separate step to extract at least part of the monovalent thallium and alkali metal values into the aqueous medium.

There is therefore also contemplated as my invention a process for preferential extraction of monovalent thallium values and alkali metal values (where present) from an organic liquid containing the same together with trivalent thallium values and an inert organic non-acidic solvent for the alkanoic acid, which comprises extracting said organic liquid in the presence of an alkanoic acid, having from 2 to 4 carbon atoms per molecule and having a molecular weight of at least 74 grams per gram-mol of acid, with water to produce an aqueous extract containing monovalent thallium and alkali metal values (where the latter is present in the organic liquid to be extracted) and a raffinate comprising the organic liquid containing the organic solvent together with trivalent thallium values and alkanoic acid, and being depleted in monovalent thallium and alkali metal values (where present).

In such a process, herein termed "back extraction," concentrations of the monovalent thallium, trivalent thallium and alkali metal values in the organic liquid to be extracted is not in any way critical and such back extraction can employ the anions, alkanoic acids, organic solvents for the alkanoic acids, concentrations of salts, amounts of alkanoic acid and organic solvent, and other process conditions disclosed above with respect to the "front extraction," i.e., the extraction of an aqueous solution containing the salts to preferentially remove the trivalent thallium values in accordance with the first above-discussed embodiment of the process of this invention.

Monovalent thallium values are herein termed to be "preferentially extracted" by such an aqueous back-extraction when the proportion of the monovalent thallium values and alkali metal values originally present in the organic liquid which are extracted into the aqueous extractant medium by the process of this invention is greater than the proportion of the trivalent thallium values originally present in the organic liquid which are extracted into the aqueous extractant. Thus, similarly to the definition given above in respect of "front extraction," monovalent thallium values are preferentially extracted in "back extraction" when $\alpha_1$ and $\alpha_2$ (when alkali metal values are present) are each greater than about 1, where "$\alpha_1$" and "$\alpha_2$" are as defined in equations (IV) and (V) above. Preferably, $\alpha_1$, and $\alpha_2$ are each greater than about 2.

The amount of water employed as extractant is not in any way critical and is solely a question of economics. Generally, however, water will be employed in back extraction in an amount at least equal to the weight of the organic liquid to be back extracted. The maximum ratio of water to organic liquid is limited only by economics and, thus, an amount of water greater than a 100-fold excess over the weight of organic liquid to be treated will generally not be employed.

The invention will be more fully understood by reference to the following specific examples, but it is to be understood that these examples are given solely for illustrative purposes and are not intended to be limitative of the invention. In the examples, the determination of trivalent thallium values is by complexometric titration with ethylenediamine tetraacetic acid, which method is sensitive to a concentration of 0.005 moles/liter and the determination of monovalent thallium values is by potassium permangenate titration. Alkali metal values are determined by a non-aqueous titration using perchloric acid in acetic acid. In the examples that follow and throughout the specification, concentrations are expressed in terms of moles per liter unless otherwise indicated.

In each of the following Examples, the aqueous media which are treated employ a pH of less than about 6, and the Tables of data report concentrations of monovalent thallium, trivalent thallium and alkali metal values as the respective cations.

EXAMPLE 1

To the upper portion of a 4-stage, continuous, countercurrent Schiebel extractor is passed at a rate of about 50 parts per hour an aqueous solution containing dissolved therein 0.75 mmol/cc thallous isobutyrate, 0.3 mmol/cc thallic isobutyrate, 0.75 mmol/cc sodium isobutyrate, and 1.5 mmol/cc isobutyric acid and to the lower portion of the extractor is passed a mixture containing 70 weight percent isobutyric acid and 80 wt. percent isobutyronitrile at a rate of about 50 parts per hour. From the extractor's upper portion there is removed about 42 parts per hour of extract comprising isobutyronitrile containing dissolved therein 0.10 mmol/cc thallous values, 0.25 mmol/cc thallic values, 0.08 sodium values, and from the lower portion of the extractor there is withdrawn at a rate of about 58 parts per hour a raffinate comprising an aqueous solution containing 0.57 mmol/cc thallous values, 0.59 mmol/cc sodium values and 0.08 mmol/cc thallic values.

Thus $k_{Tl_3}$ for the above extraction is 3.13 and $k_{Tl_1} = 0.175$. From these data, $\alpha_1$ can be seen to be 17.9 and $\alpha_2 = 23.0$.

The isobutyronitrile extract so recovered is then diluted with an equal volume of a mixture containing 20 wt. percent isobutyric acid in isobutyronitrile to provide and isobutyronitrile liquid containing dissolved therein 0.125 mmol/cc thallic values, 0.05 mmol/cc thallous values and 0.04 mmol/cc sodium values. The diluted extract so formed is then passed as feed at a rate of about 50 parts per hour to the lower portion of a second 4-stage countercurrent Schiebel extractor for back extraction. Water is passed to the upper portion of the extractor at a rate of 50 parts per hour. An aqueous raffinate is withdrawn from the lower portion of the extractor at a rate of about 52 parts per hour, the raffinate comprising an aqueous solution containing 0.044 mmol/cc thallous values, 0.056 mmol/cc thallic values and 0.034 mmol/cc sodium values. From the upper portion of the extractor there is drawn at a rate of 48 parts per hour an organic phase containing isobutyronitrile 0.07 mmol/cc thallic values, 0.004 mmol/cc thallous values and 0.005 mmol/cc sodium values.

The following equilibrium distribution coefficients can be calculated for the back extraction: $k_{Tl_3} = 1.25$, $k_{Tl_1} = 0.091$ and $k_{Na} = 0.147$. Thus for the back extraction, $\alpha_1 = 13.7$ and $\alpha_2 = 8.5$.

EXAMPLE 2

To 4 parts of a solvent containing 20 wt. percent isobutyric acid in water are added 1 mmol thallic isobutyrate and 4 mmols thallous isobutyrate. The resulting mixture is stirred to dissolve the added salts. The aqueous medium thereby resulting is passed to a separatory funnel and is agitated after addition of 8 parts of a solvent containing 15 wt. percent isobutyric acid in isobutyronitrile. The agitation is continued for 15 minutes at a temperature of 30° C. and atmospheric pressure. Thereafter, the mixture is allowed to settle and separate organic and aqueous phases are allowed to form. The recovered organic and aqueous phases are analyzed. This analysis indicates that the weight of the organic phase is 66 wt. percent of the mixture and that the organic phase contains 0.85 mmol thallic isobutyrate and 0.71 mmol thallous isobutyrate. Therefore, $k_{Tl_3} = 2.83$; $k_{Tl_1} = 0.11$ and $\alpha_1 = 25.7$.

EXAMPLE 3

To illustrate a back extraction of the process of this invention, 0.85 mmol thallic isobutyrate and 0.71 mmol thallous isobutyrate is dissolved in 8 parts of a solvent comprising isobutyronitrile containing 25 wt. percent isobutyric acid. The resulting mixture is passed to a separatory funnel and contacted with 4 parts of water with agitation. The agitation is continued for 15 minutes at 30° C. and atmospheric pressure, whereupon the mixture is allowed to settle and separate organic and aqueous phases allowed to form. Analysis of the separated, recovered liquid phases shows the organic phase to comprise 65 weight percent of the total extraction liquids and also shows that the organic phase contains 0.30 mmol thallous isobutyrate and 0.55 mmol thallic isobutyrate. For this experiment $k_{Tl_3} = 0.92$ and $k_{Tl_1} = 0.37$. Thus, $\alpha_1$ for the system is 2.49.

EXAMPLE 4

Following the procedure of Example 3, the organic phase recovered in Example 3 is back extracted in a separate step with 4 parts of water. Upon completion of the extraction, analysis of the resulting phases indicates the organic phase to comprise 64 weight percent of the total extraction liquids and to contain 0.45 mmol thallic isobutyrate and 0.22 mmol thallous isobutyrate. Thus, for this back extraction, $k_{Tl_3} = 2.25$; $k_{Tl_1} = 1.38$; and $\alpha_1 = 1.63$.

EXAMPLE 5

The procedure of Example 1 is repeated except that the aqueous solution passed to the upper portion of the countercurrent extractor contains 0.75 mmol/cc potassium isobutyrate instead of sodium isobutyrate. The extract which is removed from the extractor's upper portion comprises isobutyronitrile contained dissolved therein 0.11 mmol/cc thallous values, 0.26 mmol/cc thallic values, 0.078 potassium values, and is removed at a rate of about 45 parts per hour. The raffinate is removed at a rate of about 55 parts per hour from the lower portion of the extractor and comprises an aqueous solution containing 0.55 mmol/cc thallous values, 0.6 mmol/cc potassium values and 0.08 mmol/cc thallic values.

Thus, $k_{Tl_3}$ for the above extraction is 3.25, $k_{Tl_1} = 0.2$, $k_K = 0.13$, $\alpha_1 = 16.3$ and $\alpha_2 = 25$.

After dilution of the resulting isobutyronitrile extract with an equal volume of a mixture containing 20 wt. percent isobutyric acid in isobutyronitrile, the isobutyronitrile liquid formed contains dissolved therein 0.125 mmol/cc thallic values, 0.055 mmol/cc thallous values and 0.039 mmol/cc potassium values. The diluted extract so formed is passed to the second extractor as in Example 1 and back extracted with water. The aqueous raffinate withdrawn from the lower protion of the extractor is withdrawn at the rate of about 51 parts per hour. This raffinate comprises an aqueous solution containing 0.04 mmol/cc thallous values, 0.058 mmol/cc thallic values and 0.026 mmol/cc potassium values. An organic phase is withdrawn from the upper portion of the extractor at the rate of about 49 parts per hour and contains isobutyronitrile together with 0.075 mmol/cc thallic values, 0.0035 mmol/cc thallous values and 0.004 mmol/cc potassium values.

The equilibrium distribution coefficients for the back extraction are as follows: $k_{Tl_3} = 1.3$, $k_{Tl_1} = 0.088$ and $k_K = 0.154$. Thus, for the back extraction, $\alpha_1 = 14.8$ and $\alpha_2 = 8.4$.

EXAMPLE 6

40 Parts of a solvent containing 7.1 mmols thallic isobutyrate and 21 mmols thallous isobutyrate is passed to a separatory funnel and is extracted following the procedure of Example 2 with an extractant comprising a mixture of 40 parts of n-butyl ether and 20 parts isobutyric acid. The agitation is continued for 10 minutes at a temperature of 30° C. and atmospheric pressure. Thereafter, the mixture is allowed to settle and separate organic and aqueous phases are allowed to form. The recovered organic and aqueous phases are analyzed. This analysis indicates that the weight of the organic phase is 64 wt. percent of the mixture and that the organic phase contains 7.03 mmols thallic isobutyrate and 9.53 mmols thallous isobutyrate. Therefore, $k_{Tl_3} = 19.0$; $k_{Tl_1} = 0.46$ and $\alpha_1 = 41.3$.

EXAMPLE 7

The procedure of Example 6 is repeated except that the aqueous solution charged to the separatory funnel comprises 40 parts of an aqueous mixture containing 6.3 mmols thallic isobutyrate and 19.7 mmols thallous isobutyrate and the extractant comprises a mixture of 40 parts isobutyronitrile and 20 parts propionic acid. Analysis of the liquid phases thereby obtained shows the organic phase to contain 63 wt. percent of the extraction liquids and also to contain 5.2 mmols thallic salts and 9.2 mmols thallous salts. Therefore, $k_{Tl_3} = 2.6$; $k_{Tl_1} = 0.5$ and $\alpha_1 = 5.2$.

EXAMPLE 8

Following the procedure of Example 6, an aqueous mixture containing 42 parts water, 6.35 mmols thallic isobutyrate and 14.1 mmols thallous isobutyrate is passed to a separatory funnel and extracted therein with an extractant liquid comprising a mixture containing 42 parts isobutyronitrile and 16 parts n-butyric acid. Analysis of the liquid phases indicates the organic phase comprises 63 wt. percent of the extraction liquids and contains 6.2 mmol thallic salts and 7.44 mmols thallous salts. Thus, $k_{Tl_3} = 17.5$; $k_{Tl_1} = 0.66$ and $\alpha_1 = 26.5$.

EXAMPLE 9

Following the procedure of Example 6, an aqueous liquid comprising 42 parts water, 5.2 mmols thallic propionate and 23.4 mmols thallous propionate is passed to a separatory funnel and extracted with a liquid mixture containing 42 parts propionitrile and 16 parts propionic acid. Analysis of the resulting liquid phases indicates the organic layer comprises 43 wt. percent of the extraction liquids and contains 2.03 mmols thallic salts and 3.05 mmols thallous salts. Thus, for this system, $k_{Tl_3} = 0.83$; $k_{Tl_1} = 0.2$ and $\alpha_1 = 4.15$.

EXAMPLE 10

The procedure of Example 6 is repeated except that an equivalent amount of trifluoroacetic acid is employed instead of isobutyric acid and comparable results are obtained.

EXAMPLE 11

The procedure of Example 7 is repeated except that an equivalent amount of 2-methyl-3,3-trifluoropropionic acid is used instead of the propionic acid, and comparable results are obtained.

EXAMPLE 12

Following the procedure of Example 3, a liquid mixture containing 0.618 mmol/gram thallic isobutyrate, 1.064 mmols/gram thallous isobutyrate, 22 parts isobutyric acid, 74 parts adiponitrile and 4 parts water is passed to a separatatory funnel and is extracted therein with an equal weight of water. After agitation of the liquid for 10 minutes at 30° C. and atmospheric pressure, agitation is ceased and the extraction liquid mixture is allowed to settle so that separate aqueous and organic layers are formed. Analysis of the organic layer, which is shown to comprise 46 wt. percent of the extraction liquids, indicates this layer contains 0.15 mmol/gram thallic isobutyrate and 0.125 mmol/gram thallous isobutyrate. The aqueous layer is shown to comprise 54 wt. percent of the extraction liquids and to contain 0.056 mmol/gram thallic isobutyrate and 0.18 mmol/gram thallous isobutyrate. Thus, $k_{Tl_3} = 2.68$; $k_{Tl_1} = 0.69$ and $\alpha_1 = 3.86$.

EXAMPLE 13

Following the procedure of Example 12, a liquid containing 0.608 mmol/gram thallic isobutyrate, 1.014 mmol/gram thallous isobutyrate, 22 parts isobutyric acid, 74 parts benzonitrile and 4 parts water is extracted with an equal weight of water. After agitation for 10 minutes at 30° C. and atmospheric pressure, separate aqueous and organic phases are allowed to form which upon analysis yield the following: (1) aqueous layer = 50% of the extraction liquids and contains 0.038 mmol/gram thallic isobutyrate and 0.18 mmol/gram thallous isobutyrate; and (2) organic layer = 50% of the extraction liquids and contains 0.16 mmol/gram thallic isobutyrate and 0.13 mmol/gram thallous isobutyrate. Thus, for this experiment $k_{Tl_3} = 4.32$; $k_{Tl_1} = 0.72$ and $\alpha_1 = 5.9$.

EXAMPLE 14

The procedure of Example 13 is repeated except that the isobutyric acid-benzonitrile-water liquid mixture charged to extraction contains, instead of thallic and thallous isobutyrate, 0.31 mm/gram thallic acetate and 0.282 mmol/gram thallous acetate. After analysis of the separated aqueous and organic layers the following information was obtained: (1) aqueous layer = 52 wt. percent of the extraction liquids and contains 0.073 mmol/gram thallic acetate and 0.243 mmol/gram thallous acetate; and (2) organic layer = 48 wt. percent of the extraction liquids and contains 0.11 mmol/gram thallic acetate and 0.174 mmol/gram thallous acetate. Thus, for this experiment $k_{Tl_3} = 3.3$; $k_{Tl_1} = 1.58$ and $\alpha_1 = 2.12$.

EXAMPLE 15

The procedure of Example 12 is repeated except that the isobutyric acid-adiponitrile-water liquid mixture charged to extraction contains thallic isobutyrate in a concentration of 0.32 mmol/gram and thallous isobutyrate in a concentration of 0.31 mmol/gram. Analysis of the subsequently separated aqueous and organic layers yields the following data: (1) aqueous layer = 48 wt. percent of the extraction liquids and contains 0.137 mmol/gram thallic isobutyrate and 0.153 mmol/gram thallous isobutyrate; and (2) organic layer = 52 wt. percent of the extraction liquids and contains 0.18 mmol/gram thallic isobutyrate and 0.153 mmol/gram thallous isobutyrate. Thus, for this experiment $k_{Tl_3} = 1.32$; $k_{Tl_1} = 1.0$ and $\alpha_1 = 1.32$.

EXAMPLE 16

To determine the suitability of isobutyronitrile as a solvent in the extraction process of this invention for various alkanoic acids, separate runs are performed in which an aqueous solution containing 10 ml. water and 1 ml. of the selected alkanoic acid is admixed in a separatory funnel with 10 ml. of isobutyronitrile. The extraction liquids are stirred at a temperature of 20° C. for 10 minutes, after which the liquids are allowed to settle and separate organic and aqueous layers are allowed to form. Analysis of each layer for acid content gives the data set forth in Table I below:

TABLE I

| Run No. | Alkanoic Acid | Solubility of Acid in $H_2O$ (20° C) | Analysis Wt. % of Acid Charged in: | |
|---|---|---|---|---|
| | | | Organic Layer | Aqueous Layer |
| 1 | acetic | ∞ | 36 | 64 |
| 2 | propionic | ∞ | 68 | 32 |
| 3 | n-butyric | ∞ | 86 | 14 |
| 4 | isobutyric | 21 | 84 | 16 |

Thus, isobutyronitrile is a suitable solvent for use in the process of this invention in combination with the alkanoic acids shown in Runs 2, 3 and 4 of Table I, since the isobutyronitrile in the foregoing test extracts a majority of these alkanoic acids from the aqueous solution of the acid.

It will be obvious that various changes and modifications may be made without departing from the invention and it is intended, therefore, that all matter contained in the foregoing description shall be interpreted as illustrative only and not limitative of the invention.

I claim:

1. A process for extractively recovering trivalent thallium values from an aqueous medium having a pH of not greater than about 6 and containing dissolved trivalent thallium and monovalent thallium values which comprises extracting the aqueous medium in the presence of an alkanoic acid, having from 2 to 4 carbon atoms and having a molecular weight of at least 74 grams per gram-mol of acid, with an inert, non-acidic organic solvent for said alkanoic acid, said solvent having a limited solubility in water, to preferentially extract dissolved trivalent thallium values into the organic solvent, and recovering (1) an extract containing the organic solvent, said alkanoic acid, and extracted trivalent thallium values as a separate phase, and (2) an aqueous raffinate containing monovalent thallium values and depleted in trivalent thallium values.

2. The process according to claim 1 wherein the alkanoic acid comprises at least one member selected from the group consisting of
(1) compounds of the formula:

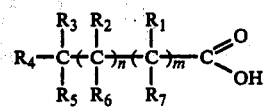

wherein n = 0 or 1, m = 0 or 1, and $R_1$, $R_2$, $R_3$, $R_4$, $R_5$, $R_6$ and $R_7$ are independently selected from the group consisting of H, Cl, Br, F, I and —CN, with the proviso that if n and m are each zero, then at least one of $R_3$, $R_4$ and $R_5$ must be Cl, Br, F, I or —CN, and (2) compounds of the formula:

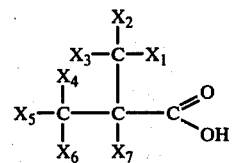

wherein $X_1$, $X_2$, $X_3$, $X_4$, $X_5$, $X_6$ and $X_7$ are independently selected from the group consisting of H, Cl, Br, F, I and —CN.

3. The process according to claim 1 wherein the alkanoic acid comprises at least one member selected from the group consisting of propanoic acid, n-butyric acid, isobutyric acid, trichloroacetic acid and trifluoroacetic acid.

4. The process of claim 1 wherein the organic solvent has a solubility in water at 20° C. of less than about 15 grams of solvent per 100 grams of water.

5. The process of claim 1 wherein the trivalent thallium values present in the aqueous medium comprise a thallic salt of an alkyl, cycloalkyl or aryl carboxylic acid having up to 20 carbon atoms per acid molecule.

6. The process of claim 1 wherein the aqueous medium to be treated also contains alkali metal values dissolved therein.

7. The process according to claim 1 wherein the organic solvent has a solubility in water at 20° C. of less than about 5 grams of solvent per 100 grams of water.

8. The process according to claim 1 wherein the trivalent thallium values present in the aqueous medium comprise at least one member of the group consisting of thallic nitrate, sulfate, perchlorate, carbonate and bicarbonate.

9. The process according to claim 1 wherein the organic solvent comprises a member selected from the group consisting of aromatic hydrocarbons, petroleum ether, alkyl ethers, monocarboxylic acid esters having at least 5 carbon atoms per molecule, organic alcohols having at least 4 carbon atoms per molecule, chlorohydrocarbons, substituted aromatic hydrocarbons, ketones and diketones having at least 5 carbon atoms per molecule, and nitriles having at least 3 carbon atoms per molecule.

10. The process according to claim 1 wherein the organic solvent comprises a member selected from the group consisting of alkyl ethers, monocarboxylic acid esters having from 5 to 20 carbon atoms per molecule, and nitriles having from 3 to 20 carbon atoms per molecule.

11. The process according to claim 1 wherein said extract containing the organic solvent, alkanoic acid and extracted trivalent thallium values also contains extracted monovalent thallium values and is contacted with water to preferentially extract monovalent thallium values therefrom, thereby producing a raffinate comprising an organic phase containing trivalent thallium values and and depleted in monovalent thallium values and an aqueous extract containing extracted monovalent thallium values.

12. A process for extractively recovering monovalent thallium values from an organic liquid medium containing dissolved trivalent thallium and monovalent thallium values, an alkanoic acid having from 2 to 4 carbon atoms and a molecular weight of at least 70 grams per gram-mol of acid, and an inert, non-acidic organic solvent for said alkanoic acid, said solvent having a limited solubility in water, which comprises contacting said organic liquid with water to preferentially extract dissolved monovalent thallium values into the aqueous extractant, and recovering (1) an aqueous extract containing the extracted monovalent thallium values as a separate phase and (2) a raffinate comprising an organic liquid depleted in monovalent thallium values.

13. A process according to claim 12 wherein the organic liquid medium to be treated also contains alkali metal values dissolved therein.

14. The process of claim 12 wherein the organic solvent has a solubility in water at 20° C. of less than about 15 grams of solvent per 100 grams of water.

15. The process of claim 12 wherein the trivalent thallium values present in the organic liquid medium to be treated comprise a thallic salt of an alkyl, cycloalkyl or aryl carboxylic acid having up to 20 carbon atoms per acid molecule.

16. The process according to claim 12 wherein the trivalent thallium values present in the organic liquid medium to be treated comprise at least one member of the group consisting of thallic nitrate, sulfate, perchlorate, carbonate and bicarbonate.

* * * * *